April 8, 1969 A. L. MENNESSON 3,437,081
FUEL FEED SYSTEMS FOR INTERNAL COMBUSTION ENGINES
Filed June 9, 1966

INVENTOR
ANDRÉ LOUIS MENNESSON
BY
ATTORNEYS

United States Patent Office 3,437,081
Patented Apr. 8, 1969

3,437,081
FUEL FEED SYSTEMS FOR INTERNAL
COMBUSTION ENGINES
André Louis Mennesson, Neuilly-sur-Seine, France, assignor to Societe Industrielle de Brevets et d'Etudes S.I.B.E., Neuilly-sur-Seine, France, a society of France
Filed June 9, 1966, Ser. No. 556,296
Claims priority, application France, June 11, 1965, 20,513;
July 27, 1965, 26,216
Int. Cl. F02m 7/06, 59/44
U.S. Cl. 123—119
16 Claims

ABSTRACT OF THE DISCLOSURE

The system includes, in addition to the main carburetting system, an auxiliary device for injecting supplementary fuel into the induction pipe leading to the engine. This auxiliary device includes a fuel accumulator having a variable volume chamber, in which fuel is accumulated under pressure, whose volume is reduced in response to a sudden increase in the air flow rate in the induction pipe. Valve means control the communication between this chamber and the induction pipe: this communication is normally blocked off, but is temporarily opened in response to a sudden increase in the air flow rate in the induction pipe.

---

The present invention relates to internal combustion engine fuel feed systems including an auxiliary device for introducing a supplementary amount of fuel into the induction pipe when the air flow rate to the engine increases suddenly.

It is known that nearly all the fuel feed systems capable of correctly metering the air and fuel mixture under stable conditions require an auxiliary device, generally called "pickup pump," for injecting, at a given point of the induction pipe, a limited amount of fuel during the transient periods for which the air flow rate increases suddenly.

This auxiliary device is nearly always necessary with conventional carburation systems wherein the fuel is fed under the effect of the suction created in a venturi by the air stream sucked in by the engine. Such a device is also often useful in feed systems, generally called "injection systems," where the fuel, after it has been metered, is delivered under pressure, through at least one injector, into the engine induction pipe at a suitable point thereof.

In these injection systems, it is common practice to make use of induction pipes called "of the resonance type" which are often very long.

Therefore, the conduits through which fuel is fed to the injectors, located close to the engine inlet valve are also very long. Now, when the feed conditions of the engine change, in particular due to a sudden opening of the air throttling member, air at the increased flow rate is fed to the engine inlet valves much more quickly than the flow rate of fuel fed by the injectors reaches the corresponding increased value. It is therefore necessary in some cases, to have these injection systems provided with a pickup pump capable of delivering a supplement of fuel during the short period for which the flow rate of the fuel delivered by the injectors is not yet adapted to the flow rate of air absorbed by the engine.

Furthermore, in order to compensate for the lag in the flow of the suitable amount of fuel through the injector or injectors, the supplementary fuel introduced by the pickup pump must be fed under a relatively high pressure at the point where it is introduced into the air stream in order that this fuel arrives to the engine inlet valve at the desired time when there is a sudden increase of the air flow rate.

Finally, the pickup fuel must be introduced relatively close to the inlet valve because, otherwise, it would be necessary to inject a considerable amount of this pickup fuel to take into account the proportion thereof that is temporarily lost due to its depositing upon the walls of the induction pipe, which have a great area.

The pickup fuel is therefore introduced downstream of the main throttle valve which controls the air flow rate and, accordingly, the orifice through which this supplementary fuel is fed may be subjected, in particular under idling running conditions, to a very high suction. It is necessary to prevent fuel from being fed through this orifice under the influence of this suction outside of the pick up periods.

The object of the present invention is to provide an auxiliary pickup device which complies with the above mentioned requirements.

It consists, chiefly, in disposing, between a source of fuel under pressure and a conduit opening into the induction pipe, generally downstream of the main throttle valve, a valve actuated by means responsive to a sudden increase of the air flow rate through the induction pipe.

Preferred embodiments of the present invention will be hereinafter described with reference to the appended drawings, given merely by way of example, and in which.

Figure 1:
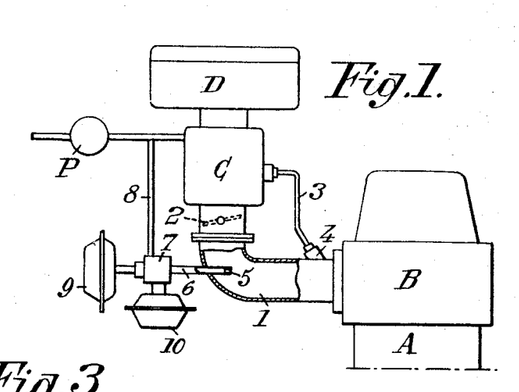
FIG. 1 is a diagrammatic elevational view, with portions in section, of an air and fuel feed system provided with an auxiliary fuel feed device according to the present invention.

The air and fuel system is made, as a whole, in any suitable manner, for instance as diagrammatically shown by FIG. 1.

This figure diagrammatically shows an internal combustion engine A provided with a cylinder head B fed with air and fuel mixture through an induction pipe 1. The fuel metering system is diagrammatically represented by C. It has been supposed to be of a downdraught type and its upper portion or air inlet is provided with an air filter D. This metering system C may be either a carburetor of the conventional type in which the air and fuel mixture is formed in the induction pipe itself and controlled by a main throttle valve 2, or a device wherein the preliminarily metered fuel is sent under pressure into induction pipe 1 through external conduits such as 3 leading to injectors diagrammatically shown at 4. In this case, of course, throttle valve 2 controls only the air flow. The metering system C is itself fed with fuel from a tank, not shown on the drawings, through a pump P.

The auxiliary pick up device comprises a fuel delivery orifice or jet 5 located at a suitably chosen point of induction pipe 1, preferably on the downstream side of throttle valve 2. This jet 5 is connected through a conduit 6 with the inside of a casing 7 which is itself connected through a conduit 8, with a source of fuel under pressure.

This casing 7 contains a valve which controls the communication between conduit 8 and conduit 6 and which is actuated by means responsive to a sudden increase of the air flow rate in induction pipe 1, such means being for instance made as shown at 9, as it will be hereinafter fully described.

The source of fuel under pressure may consist of the pump P which feeds fuel to the metering system C. It may also be distinct from this pump, as it will be hereinafter explained, and this is the case in particular when it is desired to obtain in conduit 6 a pressure higher than the delivery pressure of pump P. But it will be seen that it is possible to inject, through jet 5, fuel at a pressure higher than that existing in conduit 8, while making use of the only pump P to feed both casing 7 and metering system C. For this purpose, it is possible, to provide a device 10 capable of storing up under pressure, and then of delivering, the fuel necessary for the pickup through jet 5.

In a general manner the device works as follows:

When throttle valve 2 is opened in order to increase the air flow rate absorbed by engine A, it is necessary to deliver for a period of time, some fuel into induction pipe 1, so as form, immediately upstream of the engine inlet valves or ports, a fuel and air mixture of suitable richness until the delivery rate of the fuel, either carried by the air stream flowing through induction pipe 1 or injected through injectors such as 4, is readjusted to the flow rate of the air sucked in by the engine.

For this purpose, means such as device 9 operate, for a limited period of time, a valve in casing 7 which opens the communication between the source of fuel under pressure and jet 5. Some amount of fuel is thus injected into induction pipe 1.

Device 9 works only for a relatively short time, after which the valve actuated by the above mentioned device closes the communication between the source of fuel under pressure and jet 5.

Figure 2:
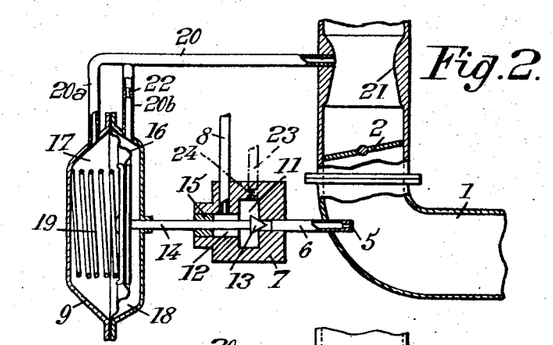
FIGS. 2, 3 and 4 show, on an enlarged scale, auxiliary fuel feed devices made according to three different embodiments of the invention, respectively.

FIG. 2 is a detailed view of a first embodiment of the present invention.

Casing 7 defines a chamber 11 from which conduit 6 starts and into which opens a conduit 12 in communication with conduit 8. A needle valve 13, actuated by a rod 14 passing through a packing member 15, permits, when it moves toward the right, of closing conduit 6 and, when it moves toward the left, of opening the passage between this conduit 6 and conduits 12 and 8.

Rod 14 is controlled by a pressure responsive device including a rigid casing 9 and a diaphragm 16 operatively connected with rod 14 and forming a deformable partition dividing the inside of said casing into two variable volume chambers 17 and 18. Diaphragm 16 is constantly urged by a spring 19 in the direction corresponding to the closing of conduit 6 by valve 13 carried by rod 14. Rod 14 extends in a substantially fluid tight manner through the wall of casing 9 on the side of chamber 18. Chambers 17 and 18 communicate respectively, through the branches 20a and 20b of a conduit 20, with induction pipe 1 at a point located upstream of the main throttle valve 2 and, preferably, at the throat of a venturi 21. Branch 20b which connects conduit 20 with chamber 18 is provided with a calibrated throttling passage 22 whereas branch 20a has no restriction.

The device of FIG. 2 works as follows:

When the internal combustion engine is running under stable conditions, and irrespective of the degree of opening of throttle valve 2, the parts occupy the position illustrated by FIG. 2. Diaphragm 16 is pushed toward the right by spring 19 since, whatever be the suction in venturi 21 and conduit 20, both of the suctions existing in chambers 17 and 18, respectively, are equal. Rod 14 is pushed toward the right, which applies needle valve 13 against the end of conduit 6.

If the air flow rate to the engine is suddenly increased by a sharp opening of throttle valve 2, the increase in the velocity of the air stream in venturi 21 causes an increase of the suction existing in conduit 20. This suction is transmitted to both of chambers 17 and 18 but much more quickly to chamber 17 than to chamber 18 due to the presence of throttling passage 22. It is only after some time that both of the suctions will be again equal to each other. But, for a short time, diaphragm 16 is moved toward the left against the action of spring 19, which moves valve 13 to open the inlet of conduit 6, thus placing the fuel feed conduit 8 into communication with jet 5.

A conduit 23 leading to the main fuel tank or to the suction conduit of pump P may open from chamber 11, in order to ensure a permanent circulation of fuel through conduit 12 and chamber 11 so as to avoid the formation and the accumulation of gases in these spaces. In order to keep a substantial pressure in conduit 12, it is obviously necessary to provide conduit 23 with a throttling passage 24. As shown by FIG. 2 (and also by FIG. 6) conduit 23 advantageously starts from the top of chamber 11, which improves the evacuation of gas bubbles which may form in said chamber 11.

Figure 3:
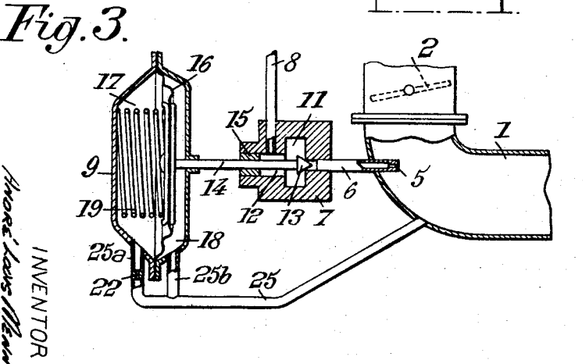

FIG. 3 shows a device analogous to that of FIG. 2 wherein casing 9 contains a diaphragm 16 urged by a spring 19 so as to push rod 14 and valve 13 toward the right. But, in the case of FIG. 3, chambers 17 and 18 are connected to the portion of induction pipe 1 downstream of main throttle valve 2 through a conduit 25 having two branches 25a and 25b. Branch 25b is unobstructed whereas branch 25a is provided with a calibrated throttling passage 22.

Under normal working conditions, whatever be the suction existing in pipe 1, this suction is transmitted equally to chambers 17 and 18 and spring 19 acts upon diaphragm 16 to urge rod 14 and valve 13 toward the right, thus closing the inlet of conduit 6.

If throttle valve 2 is suddenly opened, there is produced, downstream thereof, a reduction of the suction in pipe 1 which is transmitted through conduit 25, but, owing to the provision of throttling passage 22, the reduction of suction is transmitted more rapidly to chamber 18 than to chamber 17 so that diaphragm 16 is temporarily moved toward the left against the action of spring 19, until the respective suctions in chambers 17 and 18 again balance each other.

Thus for a short period of time, valve 13 is opened and permits fuel under pressure to be fed through conduit 8 into conduit 12 to pass through conduit 6 into induction pipe 1. Therefore, during the pickup period, fuel under pressure has been introduced, this pressure being determined by that existing in conduit 8.

Figure 4:
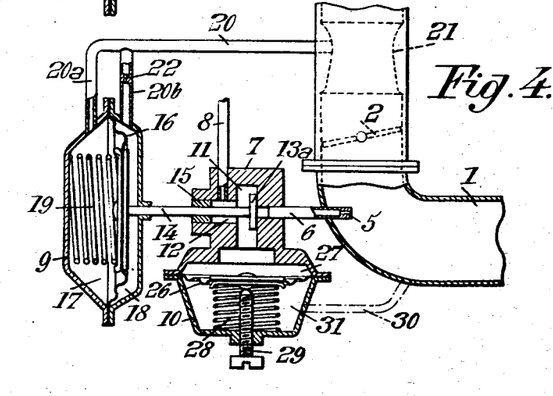
Figures 5, 6, 7, 8:
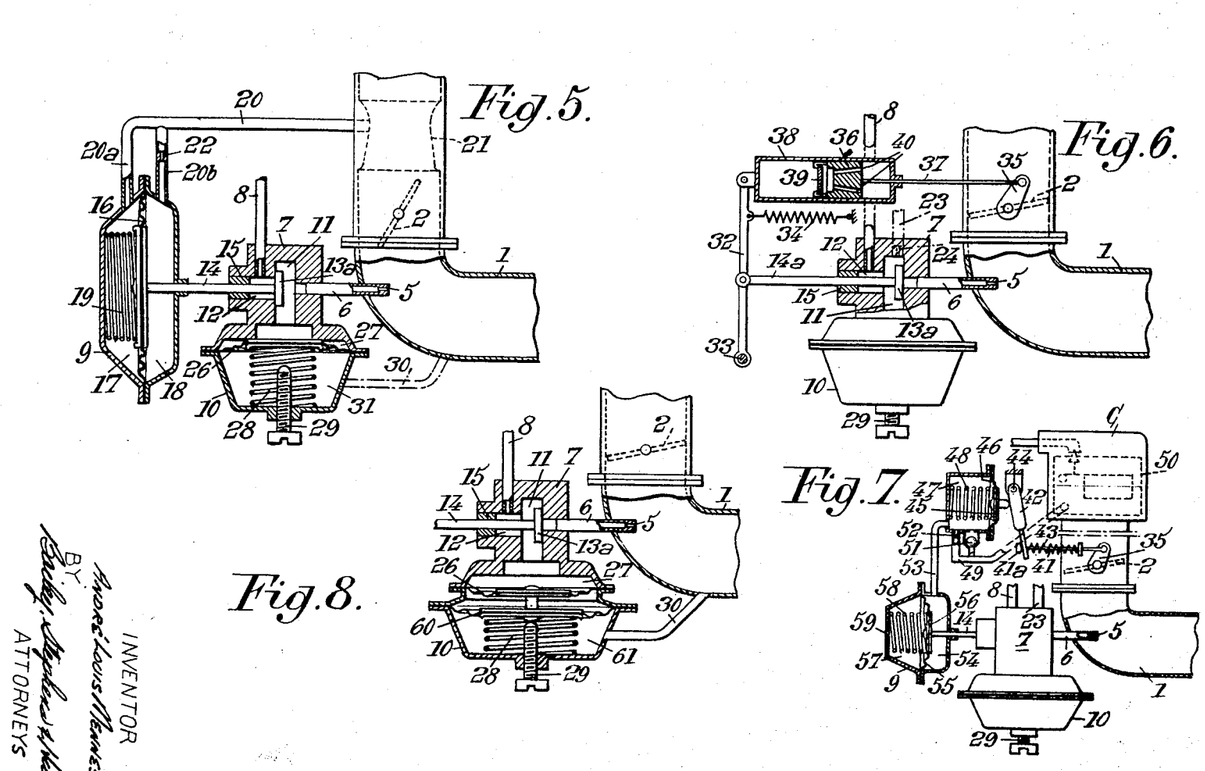
FIG. 5 shows the device of FIG. 4 in another position of operation.
FIGS. 6 and 7 show auxiliary fuel feed devices made according to two other embodiments of the invention, respectively.
FIG. 8 shows a modification of a detail of FIGS. 4 to 7.

FIGS. 4 and 5 show an improved embodiment of the invention.

As a matter of fact, the constructions illustrated by FIGS. 2 and 3 cause fuel to be through jet 5 on the one hand at the pressure existing in conduit 8, and on the other hand for a period of time depending only upon the variation of suction in induction pipe 1. Now it may be necessary to be able to act upon these two factors through separate means, respectively. For this purpose, FIGS. 4 and 5 show an arrangement analogous to that of FIG. 2 but further comprising an accumulator 10 which includes a diaphragm 26 limiting a chamber 27 in permanent communication with chamber 11. In this case rod 14 carries a valve 13a differing from the valve 13 of FIGS. 2 and 3 by the fact that it is a double action value.

When rod 14 is moved toward the right, valve 13a closes the inlet of conduit 6 leading to jet 5, whereas, when said rod 14 is moved toward the left valve 13a closes conduit 12 through which fuel under pressure is fed to chambers 11 and 27. A spring 28 urges diaphragm 26 in a direction which tends to reduce the volume of chamber 27. The displacements of diaphragm 26 are limited in both directions by abutments one of which may be fixed (displacements under the effect of spring 28) whereas the other is adjustable and consists of a screw 29.

The embodiment of FIGS. 4 and 5 works as follows:

When the engine is running normally (FIG. 4) the respective suctions in chambers 17 and 18 are equal. Spring 19 therefore acts upon diaphragm 16 so that valve 13a closes the inlet of conduit 6. In these conditions conduit 8 communicates with chamber 11 and chamber 27 and, under the effect of the fuel pressure, diaphragm 26 is pushed downwardly against the action of spring 28.

When the engine is accelerated and diaphragm 16 is moved temporarily toward the left, valve 13a closes conduit 12 and consequently prevents any inflow of fuel through conduit 8. But, on the other hand, chamber 27 is directly connected with conduit 6 and jet 5 and spring 28 causes fuel to be delivered through said jet 5.

Such an arrangement permits for instance, of injecting fuel during a period of time shorter than that corresponding to the displacement of diaphragm 16, since it is only a volume of fuel corresponding to the displacement of diaphragm 26 that is injected.

Furthermore, it is possible to connect with the portion of induction pipe 1 located downstream of throttle valve 2, through a conduit 30, the chamber 31 limited in the rigid casing of accumulator 10 by diaphragm 26 on the other side thereof with respect to chamber 27. Thus, under normal working conditions, when there is a high suction in induction pipe 1, this suction is transmitted to the space under diaphragm 26 and acts in the same manner as the pressure of fuel fed through conduit 8. It is therefore possible considerably to increase the tension of spring 28 so as to be able to obtain a higher pressure when fuel is delivered through jet 5. As a matter of fact, when throttle valve 2 is opened, the suction in induction pipe 1 and conduit 30 decreases considerably and may, in some cases, become zero, so that it is possible to dispose, owing to spring 28, of a considerable force acting on diaphragm 26, which increases the injection pressure in conduit 6 and jet 5. With such an arrangement, it is possible to obtain an injection pressure higher than that under which fuel is fed through conduit 8. This is of interest to obtain a very quick delivery through jet 5, especially when conduit 6 is relatively long.

FIG. 5 shows the device of FIG. 4 with the parts thereof in the position they occupy during the pick up period. throttle valve 2 has been opened. Diaphragm 16 has moved toward the left. Valve 13a closes conduit 12 instead of conduit 6 and diaphragm 26 moves upwardly, delivering fuel through jet 5.

As soon as the pickup period is finished, diaphragm 16 comes back into the position shown in FIG. 4, closes conduit 6 through valve 13a, and the fuel under pressure fed through conduit 8 pushes back diaphragm 26 downwardly. The device is ready for a new operation. Thus the use of accumulator 10 permits adjustment of the fuel pressure and the time of operation of the device independently of the characteristics of diaphragm 16 and of the factors which determine its operation.

FIG. 6 shows an embodiment wherein the means sensitive to a sudden increase of the air flow rate through induction pipe 1 are constituted by a mechanical connection with throttle valve 2 itself. For this purpose, the rod 14 of FIGS. 4 and 5 is replaced by a rod 14a linked to a rod 32 pivoted about a fixed axis 33 and constantly urged by a spring 34 in the direction on corresponding to the closing of conduit 6.

A lever 35 rigid with throttle valve 2 is connected to rod 32 through a pneumatic or hydraulic device consisting, in the example shown, of a piston 36 connected to lever 35 through a rod 37. This piston 36 is slidable in a fluidtight cylinder 38 filled with a fluid and piston 36 constitutes means for slowing down the passage of this fluid in one of the directions of operation, for instance by means of a check valve 39 and of evacuation holes 40. Cylinder 38 is hinged to connecting rod 32.

In the case for instance of operation under a reduced load, the parts are in the position of FIG. 6. But, if throttle valve 2 is suddenly opened, rod 37 and piston 36 move toward the left, check valve 39 is applied against the piston and prevents the flow of fluid through holes 40. Thus, fluid can flow to the other side of piston 36 only through the clearance existing between this piston and cylinder 38.

These conditions produce an anti-clockwise rotation of rod 32 and rod 14a is pulled toward the left against the action of spring 34. As soon as throttle valve 2 has stopped in its new position, spring 34 returns cylinder 38 toward the right with a slow movement corresponding to the time of delivery through jet 5.

In case of quick closing of throttle valve 2, check valve 39 opens and the fluid contained in cylinder 38 can flow through the relatively large holes 40 to pass on the other side of piston 36, which does not modify the speed of closing of throttle valve 2.

In the embodiment of FIG. 7, the auxiliary device comprises a lever 35 rigid with the main throttle valve 2, as in the preceding embodiment. To this lever 35 is pivotally connected a rod 41 the free end of which is slidable in a hole of a lever 42. A spring 43 constantly urges lever 42 against an abutment 41a provided at the free end of rod 41.

Lever 42 is pivoted about an axis 44 and it cooperates with the central disc 45 of a diaphragm 46 forming one wall of a box 47. A spring 48 keeps disc 45 applied against lever 42. The inside of box 47 is connected through a conduit 49 with a constant level fuel tank 50 belonging to the main fuel metering system C. A ball check valve 51 controls the communication between conduit 49 and the inside of box 47. A calibrated restricted passage 52 also permits a communication between conduit 49 and box 47.

The inside of box 47 also communicates through conduit 53 with a chamber 54 having one wall thereof formed by a diaphragm 55 provided with a central disc 56 rigid with rod 14, which operates a valve device of the construction shown in FIG. 4.

On the other side of this diaphragm 55, a chamber 57 contains a spring 58 which urges disc 56 toward the right and this chamber 57 communicates with the atmosphere through at least one hole 59.

Packing means are provided for permitting a fluidtight displacement of rod 14 in the right hand wall of chamber 54. The whole of chambers 54 and 57 corresponds to the device 9 of FIG. 1.

The device of FIG. 7 works as follows:

When throttle valve 2 is opened, rod 41 moves toward the left and compresses spring 43 which moves lever 42 and central disc 45, also toward the left. As check valve 51 is upon its seat, there is a compression of the fuel contained in box 47 and coming from constant level tank 50.

This compression is transmitted to chamber 54 and moves central disc 56 and rod 14 toward the left, thus causing a supplementary amount of fuel to be introduced through jet 5.

However, as soon as the movement of lever 42 has stopped, spring 58 causes the liquid to be driven through orifice 52 toward the constant level tank 50 and permits disc 56 to come back into its initial position toward the right. Thus, a supplementary opening of throttle valve 2 from the position where it was left precedingly, causes the same operations to take place and permits a further amount of fuel to be driven through jet 5.

In case of sudden closing of throttle valve 2, the lifting of check valve 51 permits an instantaneous filling of box 47 and a corresponding displacement of disc 45 toward the right under the action of spring 48. The device is therefore ready for a further operation without any delay.

FIG. 8 shows an embodiment where the pressure of injection through orifice 5 is increased through means coming in addition to those already stated concerning FIGS. 4, 5 and 6. Of course the means of FIG. 8 may be used whatever be the means for controlling check valve 13 or 13a. Accumulator 10 comprises, in addition to diaphragm 26, a second diaphragm 60, of an area much greater than that of the first one and mechanically connected thereto. This diaphragm 60 limits a chamber 61 in which spring 28 is provided and which is connected with induction pipe 1 through a conduit 30 opening downstream of throttle valve 2.

It will be seen that, as in the case of FIG. 4, diaphragm 26 is deflected in the downward direction when valve 13a is in the position indicated by FIG. 8, not only under the effect of the fuel pressure existing in conduit 8 but also under the effect of the suction existing in induction pipe 1 and transmitted to diaphragm 60. As diaphragm 60 may be made of considerable area, it is possible to use a spring 28 of considerable force.

When throttle valve 2 is opened and the suction in induction pipe 1 decreases, diaphragm 16 (FIGS. 4 and 5) or lever 32 (FIG. 6) opens check valve 13a and permits the fuel contained in chamber 27 to pass through conduit 6 to jet 5. But, at this time, it is spring 28 which exerts an upward push on diaphragm 26 and, since this spring 28 can be made of considerable power owing to the great area of diaphragm 60, it follows that it is possible to obtain, at jet 5, a very high fuel pressure.

Figures 9, 10, 11, 13, 14, 15:
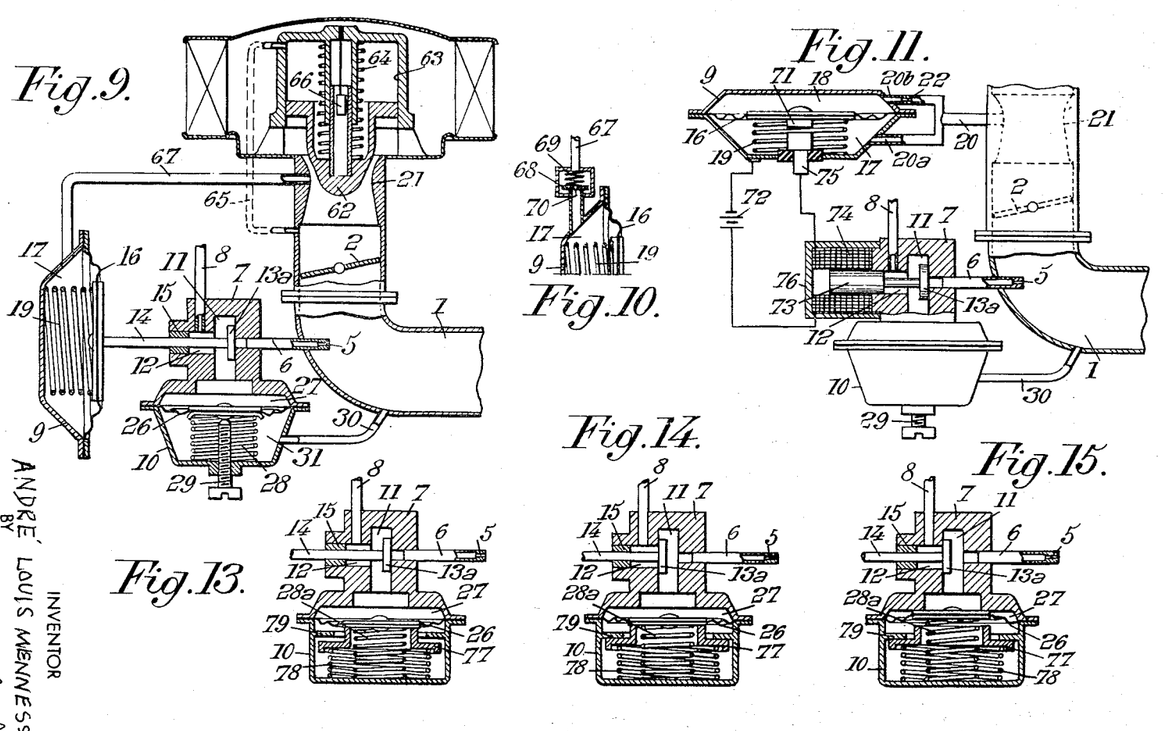
FIG. 9 shows the device of FIGS. 4 and 5 in combination with a particular metering system.
FIG. 10 shows a modification of a detail of FIG. 9.
FIGS. 11 and 12 show auxiliary fuel feed devices made according to two other embodiments of the invention, respectively.
FIGS. 13, 14 and 15 show, in three different positions of operation, a source of fuel under pressure made according to a modification.

FIG. 9 shows a modification of a metering device which is known in itself but to which the invention may be applied with advantage.

In this case, the throttled portion of fixed cross-sectional area limited inside induction pipe 1 by venturi 21, is replaced by a throttled portion of variable cross sectional area limited for instance by a sliding member 62 movable in a cylinder 63 and constantly urged by a spring 64 in the direction which closes the air passage. Sliding member 62 may, as shown, cooperate with venturi 21, of fixed cross sectional area. A conduit 65, which connects the inside of cylinder 63 with the space between sliding member 62 and the main throttle valve 2, transmits to this cylinder 63 the suction existing between sliding member 62 and throttle valve 2. Sliding member 62 generally controls means for adjusting the fuel flow rate.

It is known that this device maintains between sliding member 62 and throttle valve 2 a suction which is substantially constant and anyway which is determined by the characteristics of spring 64. It is also known that it is generally necessary to provide sliding member 62 with a damping system 66 the purpose of which is to limit the oscillations of said sliding member 62 which would be produced either by the instantaneous pressure variations in the intake conduit, or even by the mechanical vibrations of the engine. This damping system generally acts only in one direction. In other words it slows down the displacement of sliding member 62 in the opening (upward) direction and does not oppose the displacement thereof in the opposed direction.

This device permits of simplifying the arrangements of FIGS. 2 and 4 in that it is no longer necessary to provide two chambers located respectively on opposite sides of diaphragm 16. Only one is sufficient, to wit chamber 17 connected through a conduit 67, analogous to the conduit 20 of the preceding embodiments, to a space between sliding member 62 and throttle valve 2.

This is due to the fact that when the internal combustion engine is accelerating, the opening of the throttle valve 2 tends to lift sliding member 62 by increasing the suction in conduit 65. But this movement is not instantaneous due to the provision of damping system 66. It requires some time and, during this period, the suction existing in conduit 67 and in chamber 17 increases considerably, which moves rod 14 toward the left and thus permits the operation of the auxiliary devices above described.

After a certain time, variable in accordance with the operation of the damping device, the suction is restored to its normal value in conduit 67 and diaphragm 16 comes back to its normal position.

If the characteristics of the damping system 66 of FIG. 9 do not coincide with the characteristics necessary for the time of operation of diaphragm 16, use may be made of the arrangement of FIG. 10 which consists in providing between conduit 67 and chamber 17 a check valve 68 urged toward its seat by a very weak spring 69 and provided with a throttling orifice 70.

In this case, the increase in suction in the chamber 17 takes place rapidly as the thrust produced when the throttle valve 2 (FIG. 9) is opened immediately overcomes the bias of spring 69 to open the check valve 68. On the contrary, the decrease of this suction to its normal value is braked by the provision of throttling orifice 70 since, immediately after it has been actuated by the increase of the suction, check valve 68 comes back onto its seat and orifice 70 is the only way of communication between conduit 67 and chamber 17. This arrangement is chiefly interesting when damping system 66 has too short an effect to ensure by itself a good operation of the device.

FIG. 11 shows a modification of the construction of FIG. 4 according to which diaphragm 16 acts upon valve 13a through an electromagnetic relay.

The construction of FIG. 11 comprises chambers 17 and 18, the first one containing a spring 19 adapted to act on diaphragm 16, these two chambers being connected through a conduit 20 with a venturi 21 located in induction pipe 1 upstream of throttle valve 2, one of the two branches of this conduit 20 comprising a calibrated throttling passage 22.

The central portion of diaphragm 16 carries an electric contact 71 connected, through spring 19, with one of the terminals of an electric source 72. Valve 13a, instead of being connected directly to diaphragm 16, is rigid with the core or plunger 73 of a solenoid winding 74 connected, on the one hand, to electric source 72 and, on the other hand, to a contact 75 adapted to cooperate with contact 71 carried by diaphragm 16. Solenoid 74 is housed in a casing 76.

When the suction transmitted through conduit 20 moves diaphragm 16 in the downward direction, contacts 71 and 75 cooperate to close the electric circuit, thus energizing the solenoid, whereby plunger 73 is attracted against casing 76 and moves valve 13a toward the left.

FIG. 11 shows a device made (with the exception of its electromagnetic relay) according to the construction of FIG. 4, but of course this relay might be used with arrangements according to other embodiments. For instance, the control of electromagnetic relay 74 by a pneumatic deformable box subjected to the suction in induction pipe 1 might be made as shown by FIG. 3.

Figure 12:
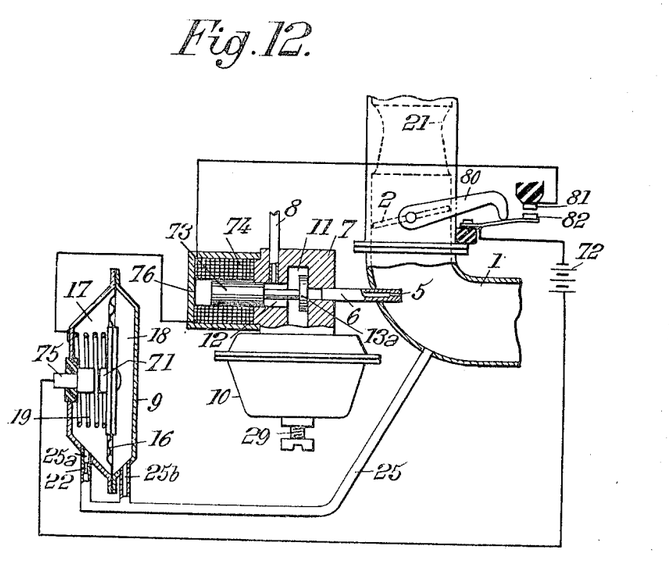

FIG. 12 shows such a device, including chamber 11, valve 13a controlled by electromagnetic relay 74 and an accumulator 10.

The electromagnetic relay is controlled by a contact 71 carried by diaphragm 16 and adapted to cooperate with a contact 75 carried by casing 9, spring 19 urging these two contacts away from each other.

As in the construction of FIG. 3, chambers 17 and 18 are connected to induction pipe 1, at a point thereof downstream of throttle valve 2, through conduit 25 with its two branches 25a and 25b, branch 25a being provided with a throttling calibrated passage 22.

Furthermore the electric circuit comprises a second pair of contacts 81–82 normally disposed to close the circuit but one of which, to wit 82, is adapted to be moved by a lever 80 rigid with throttle valve 2 so that, when said throttle valve is close to its idling position, the electric circuit is opened. This circuit can close only when throttle valve 2 has left its idling position.

The device works in the manner already described with reference to FIG. 3. When throttle valve 2 is opened, the pressure increases in induction pipe 1 and this pressure increase is transmitted unequally, for a short time, to respective chambers 17 and 18, thus displacing diaphragm 16 toward the left and causing contact 71 to cooperate with contact 75.

Thus, when throttle valve 2 is opened, the electric circuit is closed and electromagnetic relay 74 moves valve 13a toward the left, until the respective suctions in chambers 17 and 18 become equal to each other. Contacts 71 and 75 move away from each other, thus restoring valve 13a to its position shown by the drawing.

The interest of the device constituted by lever 80 and contacts 81 and 82 comes from the fact that, in a device according to FIG. 12, if no precautions were taken, in case of the engine stopping, the pressure in induction pipe 1 would increase, thus causing fuel to be injected through jet 5, as in the case of an acceleration.

In order to avoid this, when throttle valve 2 is closed, it moves contacts 81 and 82 away from each other, thus preventing, in case of stopping of the engine, the electric current from passing through electromagnetic relay 74, even if contacts 71 and 75 are applied against each other.

The system therefore does not work if throttle valve 2 is in the idling position. Contacts 81 and 82 might also be actuated by the general control of ignition of the engine but this would have the drawback that, in case of accidental stopping of the engine, the device would work and cause fuel to be injected, thus preventing a subsequent good starting of the engine.

This is why contacts 81 and 82, controlled by throttle valve 2, seem preferable to control means combined with the electric ignition circuit.

The advantage of the electromagnetic relay device is to have a sudden action and thus to eliminate possible intermediate positions of valve 13 and 13a, which are to be avoided, because they permit a temporary direct communication between conduit 8 and conduit 6, even in the case of a distributing valve 13a as in FIGS. 4, 5, 6, 8 and 11.

FIGS. 13 to 15 inclusive illustrate a feature of the present invention which is useful in many embodiments and which consists in varying the pressure with which fuel is delivered through jet 5. As a matter of fact, it is often necessary to have a very high initial pressure in order to obtain an immediate delivery of fuel while this pressure may be allowed to decrease thereafter to the end of delivery.

For this purpose, the diaphragm 26 of accumulator 10, while being subjected, as in the preceding embodiments, to the action of a spring 28a, has its rigid central portion in contact, when the internal combustion engine is running under steady conditions, with an annular piece 77 urged toward diaphragm 26 by a spring 78. Said piece 77 is made in such manner that it can come to bear upon an abutment 79 when diaphragm 26 is moving toward the top of FIG. 13.

When the engine is running under steady conditions the elements are in the positions shown by FIG. 13. The pressure of the fuel fed through conduit 8 pushes back diaphragm 26 against the action of springs 28a and 78, whereas valve 13a closes the passage toward delivery orifice 5.

When the engine is picking up, the conditions of operation are first those illustrated by FIG. 14. In other words valve 13a being moved toward the left the orifice of conduit 6 is clear and diaphragm 26 can deliver fuel toward jet 5. This operation takes place under the double action of springs 28a and 78, this last mentioned spring being very powerful so as to supply a very high initial pressure which ensures an instantaneous injection of fuel. But after a short stroke of diaphragm 26, piece 77 comes into contact with abutment 79 so that spring 78 no longer has any action upon diaphragm 26, which keeps moving upwardly only under the action of spring 28a. This is the position indicated by FIG. 15. At this time, the injection pressure through jet 5 is supplied merely by spring 28a the strength and characteristics of which correspond to a much lower pressure than that precedingly obtained.

It is thus possible, owing to this arrangement, to obtain a very high pressure at the beginning of a pickup fuel injection, this pressure getting lower in what follows, which permits of increasing the time of injection without correspondingly increasing the total amount of fuel that is injected.

In FIGS. 13 to 15, the means for controlling valve 13a has not been shown since, obviously, it may be any of those disclosed in the preceding figures.

Figure 16:
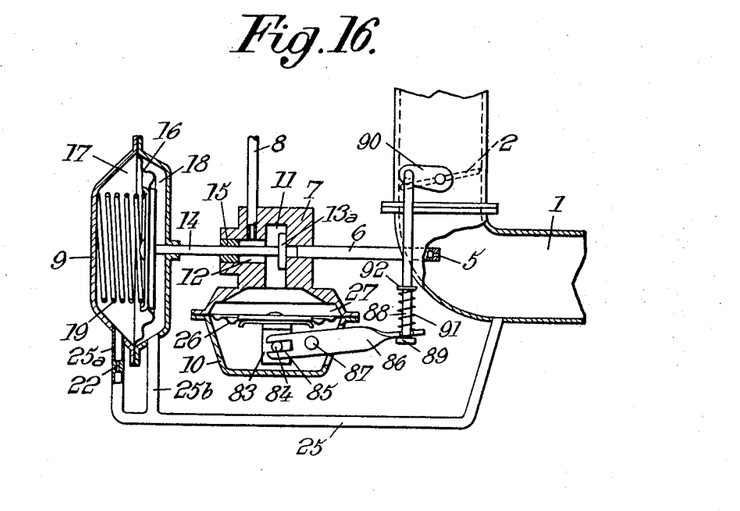
FIGS. 16 and 17 show auxiliary fuel feed devices made according to two other embodiments of the invention, respectively.

The embodiment of FIG. 16 is similar to that of FIG. 4 with the exception, on the one hand, of the means for connecting chambers 17 and 18 with induction pipe 1, which connecting means are constituted, in accordance with the disclosure of FIG. 3, by a conduit 25 connected to a portion of induction pipe 1 downstream of the main throttle valve 2, and, on the other hand of the means for controlling diaphragm 26. Therefore the elements common to FIG. 4 (modified according to FIG. 3) will not be described with reference to FIG. 16. In order to actuate diaphragm 26, there is provided, according to the embodiment of FIG. 16, mechanical means interposed between said diaphragm 26 and throttle valve 2, said mechanical means being adapted to cause said diaphragm 26 to be moved in the direction corresponding to a reduction of the volume of chamber 27, when said throttle valve 2 undergoes an opening displacement.

For this purpose, the space on the side of diaphragm 26 opposed to chamber 27 having been connected with the atmosphere through an opening provided in the rigid casing of fuel accumulator 10, said diaphragm 26 carries a rod 83 provided with a pin 84 engaged in the forked end 85 of a lever 86 pivoted about an axis 87 and extending through said opening. The other end of this lever 86 is provided with a notch in which is engaged a rod 88 provided at its lower end with an abutment 89. This rod 88 is hinged to a lever 90 rigid with throttle valve 2.

Finally a spring 91, slightly pre-stressed, interposed between a shoulder 92 of rod 88 and the right hand end of lever 86, permits of constantly applying, in a semi-positive manner, the right hand end of lever 86 against abutment 89 with a thrust depending upon the initial tension of spring 91 (which may be adjusted through means not shown).

The operation of the system device of FIG. 16 is as follows:

When throttle valve 2 is being opened, this produces an increase of the air flow rate through induction pipe 1 which results in a drop of the suction through said induction pipe. It has been seen that this suction drop has for its effect temporarily to move diaphragm 16 and valve 13a toward the left of FIG. 16, which stops the inflow of fuel through conduit 8.

On the other hand, the opening of throttle valve 2 moves rod 88 in the downward direction and consequently through the action of spring 91, rotates lever 86 about its axis 87 in the clockwise direction. This action moves diaphragm 26 upwardly and thus causes fuel contained in chamber 27 to be injected through jet 5.

This gives the possibility, when necessary, of injecting an amount of fuel which is extremely small and practically proportional to the amount of opening of throttle valve 2, which was not quite the case with the devices above described. Furthermore the initial tensioning of spring 91 permits of varying the pressure of injection through jet 5. It also permits of varying this pressure in accordance with the degree of opening of throttle valve 2. In other words, for a quick and great opening of throttle valve 2, there is obtained a great compression of spring 91, which produces an increase of the pressure of the fuel contained in chamber 27. If, on the contrary, throttle valve 2 is but very little opened, spring 91 is but slightly compressed and the increase of pressure of the fuel contained in chamber 27 is substantially smaller.

Finally, the device of FIG. 16 has the advantage of avoiding any injection of fuel when the engine is stopped. At most a very small amount of fuel may pass when, the suction in induction pipe 1 dropping to zero when the engine is stopped, valve 13a moves from its right hand to its left hand position. This movement should be reduced to a minimum so as to give a negligible value to the time of passage from one position to the other.

Figure 17:
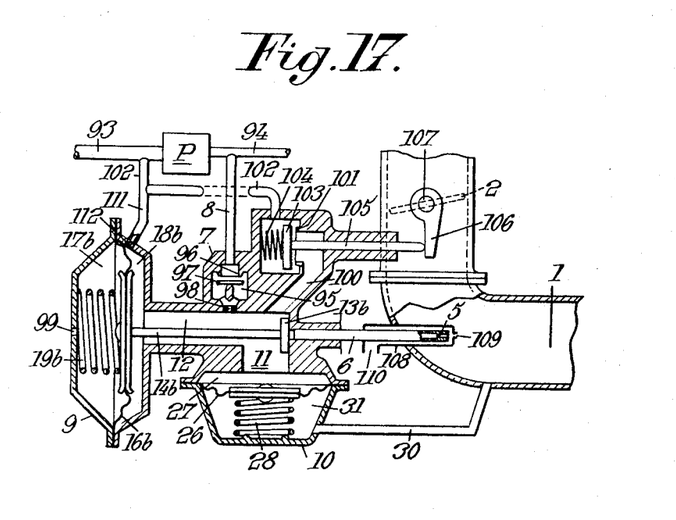

According to the embodiment of FIG. 17 the device 9 which controls the opening of valve 13b is arranged in such manner as to respond to the increase, in the space constituted by chambers 11 and 27 and conduit 12, of the fuel pressure due to the displacement of diaphragm 26.

Otherwise the construction is analogous to that of FIG. 4. FIG. 17 further shows the fuel pump P of FIG. 1, with its suction pipe 93 and its delivery pipe 94. The valve 13a of FIG. 4 is, in this case, replaced by a valve 13b.

In order to avoid the possibility that the liquid delivered by diaphragm 26 may return to conduit 8, this valve 13b might be arranged in such manner that, when it connects chamber 27 with conduit 6 it closes the communication between conduit 8 and conduit 12, in the manner shown by FIG. 4. However, it is preferable, as shown by FIG. 17, for reasons which will be hereinafter stated, to make use of a valve 13b which merely closes conduit 6 and to interpose, between conduits 8 and 12, a chamber 95 containing a check valve 97 the seat of which is shown at 96, a restricted calibrated orifice 98 being provided in the passage formed by conduit 8 and chamber 95, preferably, as shown, at the outlet of said chamber 95 into conduit 12. In casing 9, diaphragm 16b limits, on one side, a chamber 18b in permanent communication with conduit 12 and, on the other side, a chamber 17b communicating with the atmosphere through a hole 99. This chamber 17b contains a spring 19b which opposes the action of the pressure in chamber 18b and which tends, through rod 14b, to apply valve 13b against the end of conduit 6.

Furthermore, it is of interest to provide, between, on the one hand, the space comprising chambers 11 and 27 and conduit 12 and, on the other hand a delivery space such as the fuel tank, an evacuation conduit 100 of great cross section adapted to be opened or closed according as throttle valve 2 is or is not in the idling position (or a position very close thereto). Conduit 100 starts from a chamber 11 and leads to a conduit 102 connected with the fuel tank through the intermediary of the suction pipe 93 of pump P. In conduit 100 is provided a check valve 103 urged by a spring 104 toward its seat 101 and carried by a sliding rod 105 the end of which is acted upon by a lever 106 fixed to the spindle 107 of throttle valve 2.

In order to prevent the auxiliary device from delivering fuel when the internal combustion engine is stopped (i.e. when no suction is transmitted to the chamber 31 of accumulator 10) it is advantageous to have jet 5 opening not directly into induction pipe 1 but into a sleeve 108 which itself opens into induction pipe 1 through a hole 109 in line with delivery orifice 5 and slightly greater than it. The inside of said sleeve 108 communicates with the atmosphere through a hole 110 of large cross section and possibly with the air intake of induction pipe 1.

Finally, the device comprises degassing means disposed in the upper portions of at least some of its chambers. In the construction of FIG. 17 chamber 18b is provided with such a device consisting of a conduit 111 provided with a throttled passage 112 and connected with the fuel tank, for instance in the manner shown by the drawing.

The auxiliary device illustrated by FIG. 17 works as follows:

When the internal combustion engine is idling, the parts are in the position, illustrated by FIG. 17. Throttle valve 2 is practically closed, lever 106 bearing upon rod 105 so as to keep check valve 103 slightly opened. Diaphragm 26 is kept in its lower position against the action of spring 28 by the suction existing in induction pipe 1 and transmitted through conduit 30.

Diaphragm 16b occupies its right hand position, thus enabling valve 13b to close the inlet of conduit 6.

The fuel from pump P enters chamber 95 through conduit 8 and fills up the chambers of the device. This fuel escapes, on the one hand, through calibrated orifice 112 and on the other hand, past check valve 101 and through conduit 102 toward pipe 93, all of the chambers being filled with fuel.

If the engine is accelerated by opening throttle valve 2, the device works as follows:

First the opening of throttle valve 2 moves lever 106 in the anti-clockwise direction, which enables check valve 103 to come under the action of its spring 104, upon its seat 101, thus closing the communication between chamber 11 and conduit 102. The fuel that flows in through conduit 8 can then escape only through restricted passage 112 which is much smaller than orifice 98.

Fuel under pressure is therefore stored up in chambers 11and and 18b and conduits 12 and 100, the fuel pressure being, however, insufficient to move diaphragm 26 and 16b against the resistance of springs 28 and 19b.

But the opening of throttle valve 2 produces in induction pipe 1 a reduction of the suction which is transmitted through conduit 30 to chamber 31. At this time, spring 28 is calculated in such manner that it overcomes the effect of suction upon diaphragm 26 and this spring extends, pushing diaphragm 26 upwardly.

This effect produces an increase of the pressure inside the mass of fuel contained in chambers 11 and 18b which produces first the closing of check valve 97, thus preventing any possibility for the fuel to flow through conduit 8. At the same time, this increase of pressure acts upon diaphragm 16b against the action of spring 19b which is sufficiently weak to permit a leftward displacement of diaphragm 16b, rod 14b thus causing valve 13b to open.

At this time fuel can flow out through conduit 6 and jet 5 into induction pipe 1.

It will be seen that valve 13b remains open only as long as the pressure in chambers 11 and 18b is kept sufficiently high by the displacement of diaphragm 26.

The duration of the opening of valve 13b therefore depends only upon the amount of fuel to be injected, determined by the displacement of diaphragm 26.

Due to the arrangement of jet 5 in sleeve 108, this jet is subjected to the same pressure as that applied to the inlet hole 110 of sleeve 108 and not to the pressure existing inside induction pipe 1.

This eliminates the nonnegligible suction effect that would be otherwise exerted upon jet 5 and which would increase the amount of fuel fed through said jet when the suction in conduit 1 was great.

Of course hole 109 must be coaxial with jet 5 so that the fuel flowing through this jet can enter induction pipe 1 without coming into contact with the sides of hole 109.

If the internal combustion engine were stopped, for instance by cutting off ignition, there would be a danger, in the absence of any special arrangement that, as a result of the disappearance of the suction in the induction pipe, the device would work as in the case of an acceleration and inject a nonnegligible amount of fuel into said inducting pipe. This mass of fuel would interfere with a restarting of the engine, which should therefore be avoided.

This is the purpose of check valve 103. As a matter of fact, when throttle valve 2 is in idling position this check valve 103 is open, and, if the engine is stopped, the lack of suction displaces diaphragm 26 in the upward direction. But at this time the cross sectional area of flow for the fuel across seat 101 is sufficiently great to prevent, in chambers 11, 12 and 18b, any increase of pressure capable of moving diaphragm 16b toward the left and therefore of opening valve 13b. Therefore the whole of the fuel displaced by diaphragm 26 is evacuated through conduit 102 and also through restricted passage 112 toward suction pipe 93, which communicates with the fuel tank. Therefore, when the engine is stopped no fuel is delivered toward jet 5.

Restricted passage 112 provided at the top portion of chamber 18b also serves to collect, as they are being formed, the gas or vapor bubbles that might form in the apparatus. Obviously, such restricted passages may be provided at several places, either separately or simultaneously, and in such manner as to ensure total evacuation of the gaseous portions. As a matter of fact, if a nonnegligible volume of gas is formed in chambers 11, 12 and 18b, the increase of pressure in the fluid mass contained in these chambers would be less important when there is some gas present therein than when there is only liquid since gases are compressible whereas liquids are pratically not. The presence of gas in chambers 11, 12 and 18b would give variable amounts of fuel injected through jet 5 and it is therefore necessary to evacuate these gases if it is desired to obtain a correct and regular operation of the device.

It should be well understood that the auxiliary fuel feed device can be used whatever be the direction and the number of the metering systems C (FIG. 1) and also whatever be the shape, dimension, volume and characteristics of induction pipe 1.

The metering system C has not been described in detail because the invention applies whatever be the nature of this system, the only purpose of which is to deliver fuel in an amount substantially proportional to the amount of air flowing through said system.

Of course, valve 13, 13a or 13b may control the inlet of not only a single conduit 6 but also of two or several of these conduits leading each to a jet 5. Thus it is possible, in the usual manner, to have a single auxiliary pickup device controlling the injection of fuel into several branches of induction pipe 1.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. For use with an internal combustion engine, a fuel feed system which comprises, in combination:
   an induction pipe leading to said engine,
   a main carburetting system for feeding a fuel and air mixture to said engine through said pipe,
   main throttle means in said induction pipe
   and an auxiliary device for injecting a supplement of fuel into said pipe, including:
   a rigid casing fixed with respect to said induction pipe and provided with a fuel chamber,
   a fuel delivery conduit starting from said fuel chamber and opening into said induction pipe,
   a fuel feed conduit adapted to be constantly supplied with fuel under pressure, opening into said fuel chamber,
   an accumulator of fuel under pressure including a rigid casing and a movable wall limiting, together with said previously mentioned rigid casing, a variable volume chamber in unobstructed communication with said fuel chamber,
   valve means for controlling the communication of said fuel chamber with said fuel delivery conduit and with said fuel feed conduit, said valve means being adapted, on the one hand, in the normal position thereof, to close the communication between said fuel chamber and said fuel delivery conduit while opening a communication between said fuel feed conduit and said fuel chamber, and on the other hand, in a temporary position thereof, to open the communication between said fuel chamber and said fuel delivery conduit,
   control means for temporarily bringing said valve means into said temporary position thereof, said control means being operative in response to a sudden increase of the air flow rate through said induction pipe, but being unresponsive to a gradual increase of the air flow rate through said induction pipe,
   and means for moving said accumulator movable wall in the direction that reduces said accumulator variable volume chamber when said valve means is in its temporary position.

2. A fuel feed system according to claim 1 wherein said delivery conduit opens into said induction pipe downstream of said main throttle means.

3. A fuel feed system according to claim 2 further including in said induction pipe, upstream of said main throttle means, auxiliary throttle means operative in response to variations of the air flow rate through said induction pipe, said control means being responsive to variations of the suction in the portion of said induction pipe between said main throttle means and said auxiliary throttle means.

4. A fuel feed system according to claim 1, wherein said control means are pneumatic means directly responsive to instantaneous variations of the suction in said induction pipe.

5. A fuel feed system according to claim 4 wherein said control means comprise an electric circuit including a circuit breaker controlled by said pneumatic means, and an electromagnetic relay disposed for energization in said electric circuit for controlling said valve means.

6. A fuel feed system according to claim 5 wherein said electric circuit comprises a second circuit breaker operatively connected with said main throttle means to cut off said relay when said throttle means is in engine idling position.

7. A fuel feed system according to claim 1 wherein said valve means is further adapted, in the temporary position thereof, to close the communication between said fuel feed conduit and said fuel chamber.

8. A fuel feed system according to claim 1 wherein said means for moving said accumulator movable wall in the direction that reduces said accumulator variable volume chamber are spring means.

9. A fuel feed system according to claim 8 wherein said spring means comprise two springs the first one of which is arranged to act upon said accumulator movable wall for the whole range of displacement thereof, and means for limiting the action of the second of said springs to the beginning of the displacement of said movable wall in the direction that reduces said variable volume chamber.

10. A fuel feed system according to claim 1 wherein said means for moving said accumulator movable wall in the direction that reduces said accumulator variable volume chamber are mechanical means interposed between said accumulator movable wall and said main throttle means, said mechanical means being adapted to convert opening and closing movements of said main throttle means into movements of said accumulator movable wall respectively in the direction that reduces said variable volume chamber and in the opposite direction.

11. A fuel feed system according to claim 10 wherein said mechanical means include a spring comprising a semi-positive connection between said main throttle means and said accumulator movable wall for transmitting opening movement of said main throttle means into movement of said accumulator movable wall in the direction that reduces said variable volume chamber.

12. A fuel feed system according to claim 1 wherein the rigid casing and the movable wall of said accumulator limit between them a second variable volume chamber located on the other side of said movable wall from said previously mentioned variable volume chamber, said fuel feed system further comprising a conduit connecting said second variable volume chamber with a portion of said induction pipe downstream of said main throttle means.

13. A fuel feed system according to claim 12 wherein said accumulator movable wall forms part of said control means and acts on the fuel in said first mentioned variable volume chamber, which fuel acts in turn on mechanical means for controlling said valve means, whereby a sudden increase of the air flow rate through said induction pipe is translated by an increase in the fuel pressure in said first mentioned variable volume chamber, which increased fuel pressure causes said mechanical means to move said valve means into its temporary position.

14. A fuel feed system according to claim 13 further comprising a discharge capacity a fuel evacuation passage of large cross section between said accumulator first mentioned variable volume chamber and said discharge capacity and means operatively connected with said main throttle means for opening or closing said large cross section fuel evacuation passage according as said main throttle means is or is not in idling position, respectively.

15. A fuel feed system according to claim 14 further comprising a sleeve surrounding the outlet of said fuel delivery conduit into said induction pipe, said sleeve being provided with a delivery hole in line with the jet of said fuel delivery conduit and of slightly greater size than it, said sleeve being provided with a hole of relatively large cross section opening into the atmosphere.

16. A fuel feed system according to claim 1 further comprising a degassing conduit provided with a calibrated portion of restricted cross section, said degassing conduit opening out from the upper part of at least one of said chambers.

References Cited

UNITED STATES PATENTS

| | | | |
|---|---|---|---|
| 2,529,101 | 11/1950 | Orr | 123—119 XR |
| 2,601,975 | 7/1952 | Hunt | 123—119 XR |
| 2,740,391 | 4/1956 | Busch | 123—119 |
| 2,747,561 | 5/1956 | Dietrich | 123—119 |
| 3,006,327 | 10/1961 | Holley et al. | 123—119 |

JULIUS E. WEST, *Primary Examiner.*

U.S. Cl. X.R.

261—34, 69